April 29, 1969  C. L. METZLER ET AL  3,441,192
THERMOFORMED PLASTIC CUP WITH REINFORCED SIDE WALL
Filed May 17, 1967
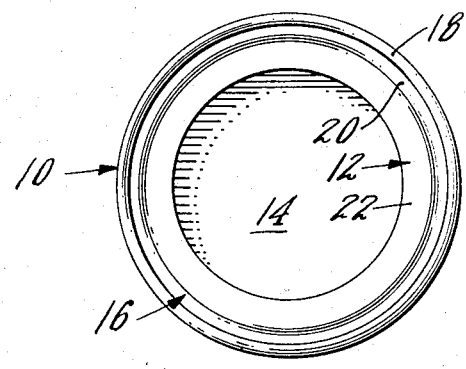
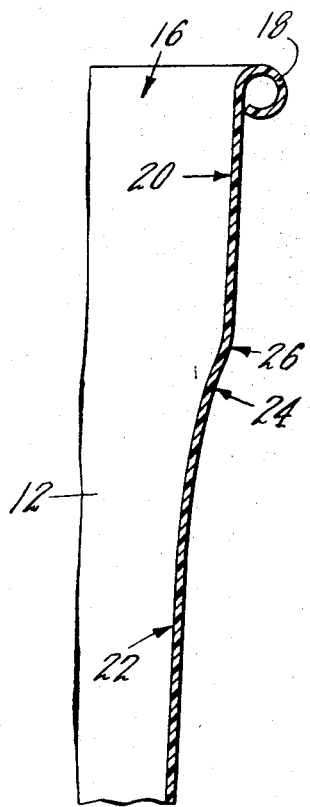
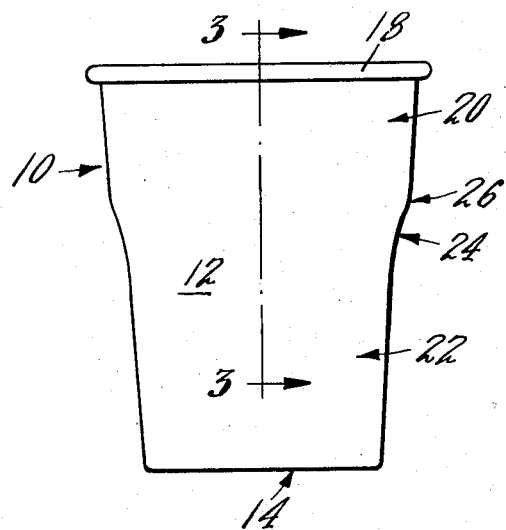
INVENTORS
CHARLES LEWIS METZLER
HENRY ALBERT HOLZWARTH
JOHN DUNCAN WARK
BY
ATTORNEY

United States Patent Office 3,441,192
Patented Apr. 29, 1969

3,441,192
THERMOFORMED PLASTIC CUP WITH
REINFORCED SIDE WALL
Charles Lewis Metzler, Alpine, N.J., Henry Albert Holzworth, Bayside, and John Duncan Wark, Freeport, N.Y., assignors to American Can Company, New York, N.Y., a corporation of New Jersey
Filed May 17, 1967, Ser. No. 639,086
Int. Cl. B65d 3/00, 21/00
U.S. Cl. 229—1.5    5 Claims

ABSTRACT OF THE DISCLOSURE

A thin-walled thermoformed thermoplastic container having an integral bottom closing one end, with the opposite end open, wherein the side wall has upper and lower frusto-conical sections separated by two arcuate sections. The lower arcuate section flares outwardly and smoothly blends into the upper arcuate section, with the upper arcuate section tangential with the upper frusto-conical section. The upper arcuate section has a toroidal shape which strengthens the side wall of the container.

Background of the invention

This invention relates to a thin-walled thermoplastic container and more particularly to such a container having a reinforced side wall to prevent excessive collapse of the side wall when the container is grasped.

In recent years, the manufacture of tapered nestable cups for single use has increasingly been changing from paper to plastic. Although the early manufacture of plastic cups generally utilized the injection-molding technique, this has given way in recent years to the manufacturing of tapered nestable cups by vacuum thermoforming. In thermoforming, a sheet of thermoplastic material is preheated and then fed into a forming station where the material is stretched into the desired shape. Afterwards, the individual container is separated from the web and packaged.

One problem encountered in the thermoforming operation is thinning of the sheet material forming the side wall as it is stretched into a container shape. Thus, the final wall thickness is frequently only one-third the thickness of the original sheet. However, as is readily apparent, it is highly desirable to have as thin a side wall as possible, albeit strong enough for the ultimate usage, in order to minimize material costs in manufacturing.

It is common in the prior art to form ribs or beads in materials in order to increase their rigidity. In the case of containers, beads are commonly used in metal cans and frequently in paper and plastic containers. However, the use of such beads generally inhibits proper nesting of nestable containers with tapered bodies due to protrusion from the body wall. Also, such beads interrupt the smooth and symmetrical appearance of the container, detracting from its overall aesthetic appearance.

It is, therefore, an object of the present invention to provide a thermoformed thermoplastic container having reinforcing in the side wall to increase the side-wall rigidity.

Another object is to provide a thin-walled thermoformed thermoplastic container having smoothly blending side wall sections without objectionable sharp break lines in the configuration.

A further object is to provide a tapered-body nestable container which is relatively simple and inexpensive to manufacture.

Numerous other objects and advantages of the invention will be apparent as it is better understood from the following description, which, taken in connection with the accompanying drawing, discloses a preferred embodiment thereof.

Summary of the invention

The above objects are achieved by providing a thin-walled thermoformed thermoplastic container having an integral bottom closing one end thereof and a brim surrounding the opposite open end. The container side wall has an upper frusto-conical section adjacent the open end and a smaller frusto-conical section integral with the bottom. The frusto-conical sections are separated from each other by two sections having arcuate shapes when viewed in cross-section. The lower arcuate section is tangential with the smaller frusto-conical section and flares outwardly and upwardly and smoothly blends into the upper arcuate section without a break line. The upper arcuate section is tangential with the upper frusto-conical section and has a toroidal shape whereby the upper arcuate section strengthens the side wall to prevent excessive collapse of the side wall when the container is grasped during usage.

Brief description of the drawings

Referring to the drawings:

FIGURE 1 is a side elevational view of a cup construction with a reinforced side wall;

FIGURE 2 is a top plan view of the cup of FIGURE 1; and

FIGURE 3 is an enlarged fragmentary sectional view taken substantially along the line 3—3 of FIGURE 1.

Description of the preferred embodiment

As a preferred or exemplary embodiment of the instant invention, FIGURE 1 shows a thermoformed thermoplastic nestable cup, generally designated 10, preferably of thermoplastic, although other materials amenable to a drawing or thermoforming operation may also be utilized. The cup 10 is of one-piece construction including a body or side wall 12 and a bottom 14. The open end 16 of the cup 10 is surrounded by a rolled brim 18.

In the manufacture of the container 10 by the thermoforming technique, a sheet of thermoplastic, preferably polystyrene, having a thickness of from approximately 0.030 to 0.035 inch, is fed into a thermoformer and, during the container-forming operation, the material is stretched forming the body 12. During stretching, the wall 12 thins to a thickness of approximately 9 to 13 mils, with the thickness of the bottom 14 being somewhat greater than the wall 12.

In the side wall 12, an upper frusto-conical section 20 is adjacent the open end 16, while in the lower portion of the side wall 12 there is a second smaller frusto-conical section 22 which is integral with the bottom 14.

Tangential with the lower smaller frusto-conical section 22 is an arcuate section 24 which flares outwardly and upwardly and smoothly blends into a second upper arcuate section 26. As the lower and upper arcuate sections 24, 26 blend into each other, they do so without the formation of a sharp break line delineating the actual line of merging. This is done by making both arcuate sections 24, 26 tangential to each other.

In order to increase the side-wall rigidity, it is desirable that the lower arcuate section 24 have a radius at least four times greater than that of the upper section 26. Preferably, this ratio would be even greater than four. For example, the lower arcuate section 24 may have a radius of approximately 4 inches whereas the upper arcuate section 26 would have a radius of approximately ½ inch. It is readily understandable that the greater the difference, the greater would be the reinforcing caused by the generally toroidal shape of the upper section 26. However, the ratio should not be so great as to form a sharp break line where sections 24 and 26 merge.

Thus, although the upper section 26 is not set off by a sharp break line within the side wall 12, its smaller radius toroidal shape functions similarly to that of a conventional bead found in the prior art, but without the protruding effect generally encountered in the formation of a conventional bead. Thus, the construction in the side wall 12 tends to strengthen and rigidify the side wall in order to prevent excessive collapse when the container is grasped during usage, without detracting from the pleasing aesthetic appearance of the container.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

We claim:

1. In a thin-walled thermoformed thermoplastic container having an integral bottom closing one end thereof and a brim surrounding the opposite open end, the improvement comprising:
    a side wall having a first frusto-conical upper section adjacent said open end and a second smaller frusto-conical section integral with said bottom;
    said first and second frusto-conical sections separated by two sections having arcuate shapes forming a continuous compound curve when viewed in cross-section;
    the lower larger radius arcuate section, tangential with said smaller frusto-conical section, flaring outwardly and smoothly blending into the upper smaller radius arcuate section without a break line;
    and the upper smaller radius arcuate section, tangential with said first frusto-conical section, having a partial toroidal shape whereby said upper arcuate section strengthens said side wall to prevent excessive collapse of said side wall when said container is grasped during usage.

2. The container of claim 1 wherein said lower arcuate section has a radius at least four times greater than the radius of said upper arcuate section.

3. The container of claim 2 wherein said lower arcuate section has a radius eight times greater than that of said upper arcuate section.

4. The container of claim 1 wherein said upper and lower arcuate sections blend tangentially into each other.

5. The container of claim 1 wherein said side wall has a thickness of from 9 to 13 mils.

References Cited

UNITED STATES PATENTS

| | | | |
|---|---|---|---|
| 2,304,278 | 12/1942 | Poster | 229—1.5 |
| 2,420,215 | 5/1947 | Wiley | 229—1.5 |
| 2,749,010 | 6/1956 | Amberg et al. | 229—1.5 |
| 2,859,557 | 11/1958 | Lattuca | 220—97 |
| 3,094,240 | 6/1963 | Wanderer | 220—72 X |
| 3,128,029 | 4/1964 | Price et al. | 229—1.5 |
| D. 199,137 | 9/1964 | Davis | 229—1.5 X |
| 3,194,468 | 7/1965 | Baron | 229—1.5 |
| 3,342,370 | 9/1967 | Johnson | 229—1.5 X |

OTHER REFERENCES

Deutsche Goldschmiede-Zeitung, July 1964, p. 561.

DAVIS T. MOORHEAD, *Primary Examiner.*

U.S. Cl. X.R.

220—97